(12) United States Patent
Besson et al.

(10) Patent No.: US 9,750,367 B2
(45) Date of Patent: Sep. 5, 2017

(54) CARTRIDGE CHAMBER OF EXTRACTION SYSTEM

(75) Inventors: Francois Besson, Colombier (CH); Blaise Rithener, La Tour-de-Peilz (CH); David Larzul, Meyzieu (FR); Julien Chalencon, Chateauneuf (CH)

(73) Assignee: Nestec S.A., Vevey (CH)

(\*) Notice: Subject to any disclaimer, the term of this patent is extended or adjusted under 35 U.S.C. 154(b) by 601 days.

(21) Appl. No.: 14/240,480

(22) PCT Filed: Aug. 21, 2012

(86) PCT No.: PCT/EP2012/066238
§ 371 (c)(1),
(2), (4) Date: Feb. 24, 2014

(87) PCT Pub. No.: WO2013/026843
PCT Pub. Date: Feb. 28, 2013

(65) Prior Publication Data
US 2014/0178546 A1    Jun. 26, 2014

(30) Foreign Application Priority Data
Aug. 25, 2011    (EP) .................................. 11178789

(51) Int. Cl.
*A47J 31/40* (2006.01)
*A47J 31/06* (2006.01)
*A47J 31/36* (2006.01)

(52) U.S. Cl.
CPC ......... *A47J 31/407* (2013.01); *A47J 31/0668* (2013.01); *A47J 31/3628* (2013.01); *A47J 31/3633* (2013.01); *A47J 31/3638* (2013.01)

(58) Field of Classification Search
CPC ....... A47J 31/407; A47J 31/06; A47J 31/0668
See application file for complete search history.

(56) References Cited

U.S. PATENT DOCUMENTS

| | | | |
|---|---|---|---|
| 2006/0174769 A1* | 8/2006 | Favre | A47J 31/0668 99/275 |
| 2014/0069281 A1 | 3/2014 | Ryser et al. | |

FOREIGN PATENT DOCUMENTS

| | | |
|---|---|---|
| EP | 0710462 | 5/1996 |
| EP | 1219217 | 7/2002 |
| EP | 1859714 | 11/2007 |
| WO | 2010149468 | 12/2010 |

\* cited by examiner

*Primary Examiner* — Erik Kashnikow
*Assistant Examiner* — Chaim Smith
(74) *Attorney, Agent, or Firm* — K&L Gates LLP

(57) ABSTRACT

A system comprises a cartridge (9) containing a beverage ingredient and a device (1) for brewing the ingredient in the cartridge by supplying a brewing liquid such as heated water into the cartridge. The device has upstream and downstream cartridge enclosing parts (7, 8) relatively movable between an open position for inserting and/or removing the cartridge and a closed position for forming a brewing chamber (11) enclosing the cartridge during brewing. The brewing chamber (11) has a confining expansion space (12) which is: unoccupied by the cartridge (9) when the enclosing parts (7, 8) are in the closed position enclosing the cartridge; and occupied by the cartridge upon expansion thereof caused by exposure of the ingredient to the brewing liquid.

6 Claims, 1 Drawing Sheet

CARTRIDGE CHAMBER OF EXTRACTION SYSTEM

CROSS REFERENCE TO RELATED APPLICATIONS

The present application is a National Stage of International Application No. PCT/EP2012/066238, filed on Aug. 21, 2012, which claims priority to European Patent Application No. 11178789.1, filed Aug. 25, 2011, the entire contents of which are being incorporated herein by reference.

FIELD OF THE INVENTION

The present invention relates to a system including a cartridge and a cartridge extraction device that has an extraction chamber in which a cartridge can be inserted, extracted and from which it can be evacuated. The extraction device can be incorporated in a beverage preparation machine.

For the purpose of the present description, a "beverage" is meant to include any liquid food, such as tea, coffee, hot or cold chocolate, milk, soup, baby food, etc. . . . Cartridges designate any enclosure for containing a pre-portioned ingredient that is soft or flexible, such as pods, and made of any material, recyclable or non recyclable, biodegradable or non-biodegradable, such as aluminium or plastic, in particular aluminium pods or aluminium capsules.

BACKGROUND ART

One problem encountered with ingredient cartridge systems is the handling of that cartridge in an extraction device and the closing of the latter around the cartridge to perform the extraction process and then the proper evacuation of the cartridge from the extraction device. The cartridge usually has to be positioned by the user on a cartridge support or in a housing, then the device is closed manually or automatically around the cartridge.

It is important to correctly position the cartridge so that the device closes properly around the latter and to form a good seal to ensure good conditions of extraction. Bad positioning may damage the cartridge, and thus affect the conditions of extraction.

For the sealing of the device around the cartridge to permit proper extraction by passing a pressurized liquid through the cartridge without undesired leakage, the closing of the device around the cartridge must be carried out with a high level of precision. The closing distance of the mechanical closing arrangements of such devices are usually manually adjusted during the manufacturing process of the device to achieve the required level of precision. The loading of the capsule must also be easy, without trial and error as to the correct position of the capsule in the device. The loading must also be as rapid as possible and not require excessive manipulations.

WO 2005/004683 relates to a capsule brewing device comprising: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position said capsule in an intermediate position; a drink pouring system; and the second movable part is so arranged and constructed to move the capsule from the intermediate position into the extraction position when the device is closed. EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The pod is passed through the external housing to the infusion chamber via a rigid pod feed channel and then the pod is transferred into the infusion chamber by an external bushing on the movable rear part of the brewing unit which is provided with a cam-like path for moving the rear part. This arrangement involves several problems. The pod must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the pod, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement.

WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine.

U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 6,904,840, U.S. Pat. No. 7,131,369, US 2005/0106288, US 2006/0102008, WO 2005/002405, WO 2005/016093, WO 2006/005756, WO 2006/066626 and WO 2007/135136.

To avoid the problem relating to precise mechanical closing of the extraction device around an ingredient cartridge, it is known to provide a hydraulic closure system in which the heated water used for extracting an ingredient in a cartridge is also used to actuate a hydraulic closure mechanism. In this case, the closing distance does not require special adjustment since the hydraulic closing force urges the cartridge supports of the extraction device together around the cartridge. An example of such a system is for instance disclosed in WO 2008/037642. Various systems have been developed along this idea, as for instance discussed in EP 1 219 217, EP 1 353 591, EP 1 480 540, EP 1 545 278, EP 1 776 026, EP 1 912 542, WO 2005/115206, WO 2006/005736 and WO 2011/042400.

Another problem is related to the optimal extraction of brewable ingredients supplied within a cartridge into the extraction device. On the one hand, there is a logistic and production need to maximize the filling of cartridges with ingredient so as to minimize the cartridge size/ingredient mass ratio, whereby packaging material and volume of the cartridge for storing and shipping can be minimized. A solution to this problem is compacting the brewable ingredient in the cartridge. On the other hand, to circulate an extraction fluid, e.g. heated water, through the cartridge, the brewable ingredient should not be compacted to such an extent as to form a more or less impervious mass. Of course, it is possible to increase the pressure of the circulating extraction fluid to an extent sufficient to overcome the barrier formed by the ingredient mass in the cartridge. However, this approach leads to a significant slow down of the extraction speed and beverage preparation due to the pressure drop through the ingredient mass. Moreover, significantly forcing the extraction fluid under high pressure through the brewable ingredient leads to extraction of undesirable solid compounds of the brewable ingredient which affect the taste of the beverage that becomes too strong and harsh. This latter phenomenon is known in the art as "over-extraction".

SUMMARY OF THE INVENTION

It is therefore a preferred object of the present invention to alleviate at least some of the abovementioned problem, in particular to provide a solution to the conflict between the maximization of the filling of ingredient cartridges and the minimization of over-extraction.

The invention relates to a system comprising a cartridge containing a beverage ingredient and a device for brewing the ingredient in the cartridge by supplying a brewing liquid such as heated water into the cartridge. The device has upstream and downstream cartridge enclosing parts relatively movable between an open position for inserting and/or removing the cartridge and a closed position for forming a brewing chamber enclosing the cartridge during brewing.

Typically, the cartridge can be inserted into the device from above under the effect of gravity. Evacuation of the cartridge upon reopening of the enclosing parts may also be driven by gravity.

Typically, this device is comprised in a beverage preparation machine for receiving ingredient cartridges such as capsules and/or pods. For instance, the machine is a coffee, tea, chocolate or soup preparation machine. In particular, the machine is arranged for preparing within the extraction chamber a beverage by passing hot water or another liquid through a cartridge containing an ingredient of the beverage to be prepared, such as ground coffee or tea or chocolate or cacao or milk powder.

For example, the preparation machine comprises: a beverage preparation unit arranged to receive cartridges for use and evacuate cartridges upon use, e.g. an extraction device; a housing having an opening leading into an area to which cartridges are evacuated from the preparation unit; and a receptacle having a cavity forming a storage space for collecting cartridges evacuated to such an area into the receptacle to a level of fill. The receptacle is insertable into the area for collecting used cartridges and is removable from this area for emptying the collected cartridges. Examples of such machines are disclosed in WO 2009/074550 and in WO 2009/130099, of which the respective U.S. counterparts US 2010/0263550 and US 2011/0041696 are incorporated herein by reference.

In accordance with the invention, the brewing chamber has a confining expansion space which is:
    unoccupied by the cartridge when the enclosing parts are in the closed position enclosing the cartridge; and
    occupied by the cartridge upon expansion thereof caused by exposure of the ingredient to the brewing liquid.

The expansion space is a confining space. Hence, beverage formed in the cartridge is not intended to flow out of the cartridge through this space. Normally, the cartridge will not be opened, e.g. cut or torn at the level of this expansion space.

The expansion space serves to increase the available brewing space in the ingredient cavity of the cartridge so as to inhibit undesirable over-extraction of the ingredient by the brewing liquid. Such over-extraction can be caused by an excessive flow resistance through the ingredient caused by the expansion of the wetted ingredient without a corresponding available space for absorbing the expansion, in particular when the brewing liquid is supplied in a pressurised form in the cavity, e.g. by a pump that pressurises the liquid within the range of 3 to 25 bar typically 5 to 20 bar.

Other aspects of the invention relate to: the use of a cartridge for such a system; and a method of extracting a cartridge in such a system.

Further features and advantages of the invention will appear in the detailed description and in the claims and in the drawings.

BRIEF DESCRIPTION OF THE DRAWINGS

The invention will now be described with reference to the schematic drawings, wherein.

DETAILED DESCRIPTION

Figure 1A:
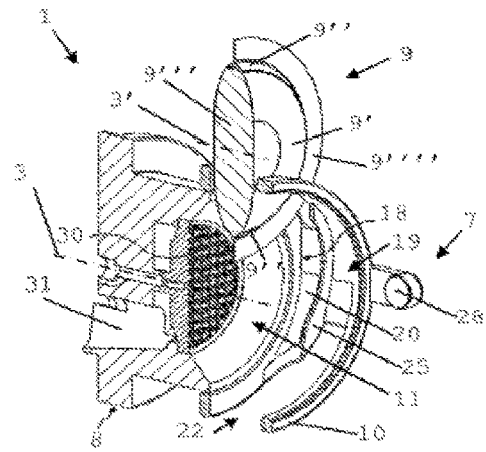
FIGS. 1a and 2a illustrate part of a prior art system having an extraction device and an ingredient cartridge that can be improved into a system in accordance with the invention.

The invention is now described with reference to the particular embodiment illustrated in FIGS. 1a to 2c.

These Figures illustrate different aspects of a system incorporating a brewing device 1 and a cartridge 9 for preparing beverages by circulating heated liquid, such as water, through an ingredient cartridge 9 in the form of a more or less soft or flexible pod, e.g. made of a generally sealed and air-tight flexible envelope, such as plastic or aluminium envelope containing the more or less compacted beverage ingredient e.g. ground coffee, as for example commercialised by NESPRESSO™.

The particular embodiment of cartridge 9 illustrated in the Figures has the shape of a generally round tablet that has an envelope 9' with a peripheral part 9" enclosing an ingredient cavity 9'''. The peripheral part 9" has an extension that forms an annular sealing flange 9'''' around the cartridge 9. Examples of such cartridges 9 are described in greater details in WO 2011/000723, WO 2011/000724 and WO 2011/000725.

Device 1 is configured for brewing the ingredient in cartridge 9 by supplying a brewing liquid such as heated water into the cartridge via a liquid supply arrangement 38. Device 1 has an upstream cartridge enclosing part 7 and a downstream cartridge enclosing part 8. Upstream and downstream enclosing parts 7,8 are relatively movable between an open position for inserting and/or removing cartridge 9 and a closed position for forming a brewing chamber 11 enclosing cartridge 9 during brewing.

A flavoured beverage, e.g. tea or coffee, is formed by mixing the liquid with the ingredient in the cartridge 9 and collecting the beverage at a beverage outlet 31 via a passage 31'.

Figure 2A:
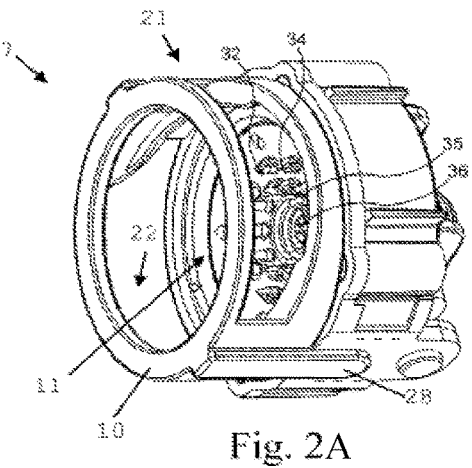

In the particular embodiment illustrated in FIGS. 1*a* and 2*a*, the upstream part 7 has a holding member 10 for handling cartridge 9 when inserted and/or removed into device 1. Alternatively, holding member can be fixed to the downstream part 8 or be relatively movable relative to both parts 7,8.

Cartridge holding member 10 is provided in an open gap left in the open position of enclosing parts 7,8 to receive and hold cartridge in its descent when supplied into device 1 from above.

Holding member 10 has a general cylindrical or "ring" form. It comprises a first chamber or holding chamber 18 arranged to receive and hold cartridge 9 in a prepositioning place when brewing device 1 is in the open position. It also comprises a second chamber or ejection chamber 19 arranged to receive cartridge 9 when device 1 is closed and therefore enable the cartridge's removal as soon as device 1 is re-opened. Holding chamber 18 is delimited by coaxial holding surfaces 20 that hold the edge of the cartridge against gravity. The transversal cross-section of surfaces 20 are slightly larger than enclosing part 8 so as to enable part 8 to traverse relatively holding chamber 18. The portions of cylinder 20 are such that cartridge 9 can stand in a substantially upright or slightly inclined position.

In the upper region of chamber 18, an opening 21 is provided which is of sufficient width to enable cartridge 9 to be inserted in the chamber 18 by effect of gravity, as illustrated in FIG. 1*a*.

Ejection chamber 19 is placed adjacent holding chamber 18. It has a lower opening 22 substantially opposite the cartridge insertion opening 21 for cartridge 9 to fall freely by gravity when device 1 is re-opened after brewing.

The holding member 10 has a rear cylindrical portion and front cylindrical portion of diameters slightly larger than the external diameter of downstream part 8 in order for part 8 to slide in holding member 10 during closing.

The two chambers 18,19 of holding member 10 are separated by a cartridge retainer 25 oriented transversally to the sliding (closing) direction. Retainer 25 can be a ramp surface comprising a pair of arc-shaped ridges onto which edge 9'''' of cartridge 9 can be supported. The ramp surface can be slightly inclined relative to the enclosing plane. The portions of the ridges protrude inwards in the radial direction and are dimensioned to retain the edge of the cartridge on both sides of the cartridge. The size of the portions of ridges is given by the diameter of the enclosing member 8. For instance, it can be about 1-4 mm.

Holding member 10 is fixed on the lateral sides of upstream part 7 by a pair of rearwardly protruding arms 28. Therefore, holding member 10 is fixed or static relative to the upstream part 7 but mobile relative to downsteam part 8 during the closure movement.

A detailed description of holding member 10 operating within the assembly formed by upstream part 7 and downstream part 8 to handle cartridge 9 is provided in WO 2007/135135 to which the reader may turn for implementing this aspect of device 1.

The actuation of upstream and downstream parts 7,8 between the open and closed positions is illustrated in detail in the above WO 2007/135135. A variation thereto that can be used for actuating device 1 is disclosed in WO 2011/042400.

Enclosing parts 7,8 can be mounted along a frame to be capable to reciprocate along a substantially longitudinal axis. For closure of the enclosing parts 7,8 about cartridge 9, the upstream and downstream parts 7,8 are forced to come closer to the to a position where they can form a fluid tight engagement together at peripheral matching surfaces while pinching edge 9'''' of cartridge 9 in-between in the closed position.

Normally, device 1 is integrated in a beverage preparation machine including a fluid circuit with a liquid injection arrangement.

Hence, extraction device 1 may be associated with a fluid circuit that has a liquid injection arrangement which includes: a source of liquid, such as cold water in particular stored in a reservoir, a pump for pumping liquid from reservoir via a conduit, a heater for heating the liquid and inlet 38 of brewing chamber 11 for supplying the heated liquid into chamber 11.

In chamber 11, the pressurised and heated liquid flows through cartridge 9 to form a beverage by extraction of the ingredient contained in cavity 9''' of cartridge 9, the beverage being collected and dispensed via outlet 31 associated with downstream part 8, for example into a user cup or mug located thereunder.

When device 1 is arranged to brew ingredients contained in sealed or partly sealed cartridges 9, device 1 may include cartridge openers 30,32. For example, upstream part 7 may include an upstream cartridge opener 32 and/or downstream part 8 may have a downstream cartridge opener 30.

Figure 1B:
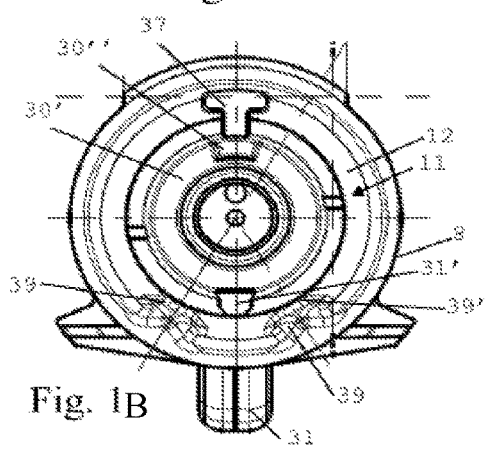
FIGS. 1b, 1c, 1d, 2b and 2c show in detail portions of the device illustrated in FIGS. 1a and 2a which device further incorporates the improvements of an embodiment of a system in accordance with the invention.
Figure 1C:
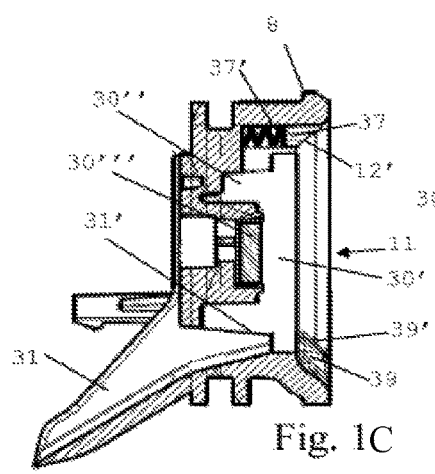
Figure 1D:
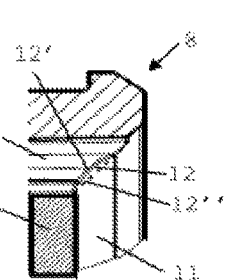

As illustrated in FIGS. 1*b*, 1*c* and 1*d*, brewing chamber 11 has a confining expansion space 12 which is unoccupied by cartridge 9 when enclosing parts 7,8 are in the closed position enclosing cartridge 9; and occupied by cartridge upon expansion thereof caused by exposure of the ingredient to the brewing liquid.

As illustrated in greater details in FIGS. 1*c* and 1*d*, expansion space 12 can be delimited by a groove or recess 12' adjacent to a peripheral portion 9" of cartridge 9 when cartridge 9 is enclosed by upstream and downstream parts 7,8. Depending on the required expansion space, groove or recess 12' may be relatively shallow. The shape of expansion space 12 depends of course of the shape of cartridge 9 and the required expansion of cartridge 9 during brewing. Hence, the expansion space is not necessarily provided in the form of a recess or groove projecting out of the brewing chamber.

Prior to exposure of the ingredient in cavity 9''' to the brewing liquid, the peripheral portion 9'' is not located within expansion space 12 and follows dashed line 12'' indicated in FIG. 1d. In this case, the peripheral portion 9'' has the shape of a generally truncated cone. When the ingredient is exposed to the brewing liquid, the ingredient is wetted by the liquid and expands within cavity 9''', whereby peripheral portion 9'' is pushed into expansion space 12 and may be brought to expand towards or even match the shape of groove or recess 12'.

Expansion space 12 is a confining space. Hence, beverage formed in cartridge 9 is not intended to flow out of cartridge 9 through space 12. Normally, cartridge 9 will not be opened, e.g. cut or torn, at the level of expansion space 12.

Expansion space 12 serves to increase the available brewing space in cavity 9''' so as to inhibit undesirable over-extraction of ingredient by the brewing liquid due to excessive flow resistance through the ingredient caused by the expansion of the wetted ingredient, in particular when the brewing liquid is supplied in a pressurised form in the cavity 9''', e.g. by a pump that pressurises the liquid within the range of 3 to 25 bar typically 5 to 20 bar.

Typically, expansion space 12 has a volume that is in the range of 1 to 10% of the volume of brewing chamber 11 or of the volume of ingredient cavity 9''' of cartridge 9, in particular in the range of 1 to 5% such as 1.5 to 4%, when enclosing parts 7,8 are in the closed position for enclosing cartridge 9 prior to expansion of cartridge 9.

Upon expansion, cartridge 9 can occupy at least 50% of the expansion space (12), in particular at least 60% or 70% thereof. Typically, upon expansion, cartridge 9 will occupy at least 80% of expansion space 12, in particular at least 90% thereof, such as at least 95% or 98% thereof. The occupation of expansion space 12 by cartridge 9 will depend on the flexibility of cartridge 9, the nature and degree of filling of the ingredient in cavity 9''' and the pressure of the flow of liquid in cartridge 9.

Expansion space 12 can be delimited on downstream part 8, e.g. as illustrated in the particular embodiment in the Figures. In a variation, the expansion space can be delimited on the upstream part or even on both parts.

Delimitation surface 12' of expansion space 12 can be slightly angled away from a facing surface 9'' of the cartridge 9 before expansion thereof, in particular angled away by an angle of no more than 10 deg., such as no more than 5 deg. Such a slight angle, i.e. the absence of sharp edges at this location, prevents tearing or cutting cartridge envelope 9' at or about delimitation surface 12' when cartridge 9 expands in chamber 11.

Figure 2B:
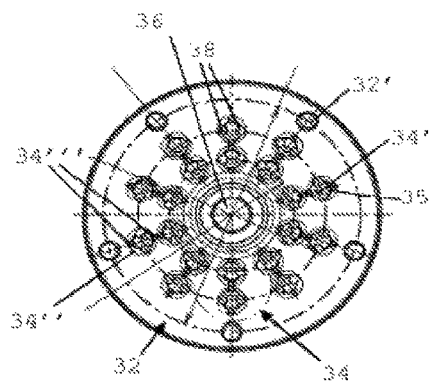
Figure 2C:
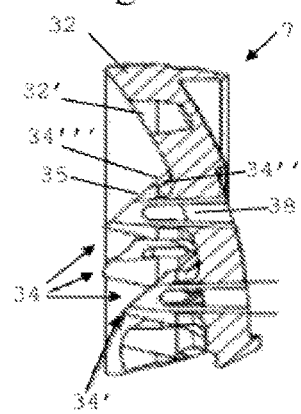

As illustrated in FIGS. 2b and 2c, upstream part 7 typically has at least one liquid injector 32 for supplying liquid into the cartridge 9. When cartridge envelope 9' is sealed on the cartridge upstream side, such an injector 32 may have a piercer 34 for piercing an upstream portion of envelope 9' and a liquid injection conduit 38 for injecting liquid into cartridge 9 upon piercing thereof. Liquid injector 32 has in particular a plurality of piercers 34 and/or a plurality of injection conduits 38. In the illustrated embodiment, piercers 32 are in an annular and radial arrangement on injector 32. In particular, 20 piercers 34 are arranged in such a fashion in this embodiment.

Injection piercers 34 may have a generally tapered shape, in particular a generally cylindrical and/or conical, or prismatic and/or pyramidal shape, such as a tapered shape that that has a truncation surface 35 delimiting a piercing edge 34'. Injection piercers 34 may be driven manually into cartridge 9.

Piercer 34 can delimit internally or partly internally thereof liquid injection conduit 38. In particular, at least one piercer 34 may delimit a pair of fluid conduits 38.

In a variation, such piercers can be separated from the liquid injection conduit. In such a case, the piercers are "mere" piercers for opening the cartridge and not "injection" piercers 34 for injecting liquid into the cartridge, the liquid being not injected into the cartridge through the piercers but adjacent thereto.

Piercer 34 can have a base with a laterally projecting reinforcing foot, such as a foot that deforms envelope 9' of cartridge 9 optionally without significantly tearing or cutting thereof. To reinforce piercer 34 and avoid failure by breaking, such a foot can be used. This offers the advantage not to affect the opening ability of cartridge 9 (opening edge and penetration angle of the piercer into the cartridge) and required effort therefor.

This foot can have a body 34'' that extends around an entire periphery of the base and/or a body 34''' projecting radially or diametrally or diagonally from the base.

As illustrated in FIGS. 2b and 2c, injector 32 has an anchorage arrangement 32' for anchoring injector 32 into upstream part 7, e.g. spaced apart and annularly arranged openings 32' to fix injector 32 with rivets and/or screws to part 7.

Injector 32 can be provided in a shallow recess of upstream part 7. Injector 32 is typically configured to inject water under pressure into cartridge 9 when device 1 is tightly closed. Injection 32 can comprise at least one water inlet and possibly piercers 34.

Furthermore, upstream part 7 typically includes an upstream cartridge pusher 36 for pushing cartridge 9 away from upstream part 7 at removal of cartridge 9. Hence, for an easy and reliable removal of cartridge 9, in particular from piercer(s) 34, pusher 36 can be movably arranged to push cartridge 9 away from injector 32 as enclosing parts 7,8 re-open. As a result, the cartridge is disengaged from the piercing elements 34 and falls down by gravity from chamber 11. A reciprocating motion of pusher 36 can be coordinated with the drive mechanism of enclosing parts 7,8. Such a pusher 36 and its incorporation into extraction device 1 is disclosed in greater details in WO 2007/135135.

An arrangement 30 for opening a downstream portion of cartridge 9 and/or for filtering the beverage can be provided. For instance, it can be formed of a plate comprising elements in relief to puncture the cartridge either during closure of the device or under the effect of the pressure building up inside the cartridge during the brewing operation.

Especially when the downstream portion of cartridge envelope 9' is sealed, downstream part 8 can incorporate an opening arrangement 30. Such an arrangement may include one or more piercing elements, e.g. in the shape of cones, pyramids, pins or the like.

Arrangement 30 may be generally configured as a plate.

Arrangement 30 can be secured in an opening 30' of downstream part 8, e.g. centrally arranged in the middle of annular expansion space 12.

An arrangement 30 in the shape of a disc plate bearing cartridge openers (e.g. piercers) is illustrated in FIG. 1a and schematically indicated in FIG. 1d. Cavity 30' for receiving arrangement 30 is shown in FIGS. 1b and 1c. A fastening opening 30'' for arrangement 30 is illustrated in FIG. 1c. For instance, a foot of arrangement 30 may be force-fitted, clipped, screwed, glued or welded into opening 30''.

Downstream piercing arrangement 30 may be a delayed piercing arrangement, e.g. opening cartridge 9 by expansion thereof under pressure against arrangement 30 due to the pressurised liquid circulated into cartridge 9.

Downstream part 8 may have a cavity for receiving a cartridge sensors 30''', e.g. for identifying the presence and/or the type of a cartridge 9 inserted into device 1. Such cartridge sensor system can be of the type disclosed in WO 2011/000723, WO 2011/000724 and WO 2011/000725.

As illustrated in FIGS. 1b, 1c and 1d, downstream part 8 may comprise a downstream cartridge pusher 37 for assisting removal of cartridge 9 from piercing arrangement 30, in particular by pushing and deforming optionally without tearing or cutting cartridge 9. Cartridge pusher 37 may be biased into a pushing direction by a biasing spring 37'.

In the particular embodiment disclosed in FIGS. 1b to 1d, pusher 37 is arranged to push on peripheral part 9' ingredient cavity 9''' of cartridge 9. Hence, pusher 37 pushes the ingredient body of cartridge 9 and not merely on (possibly freely deformable) cartridge flange 9''''.

In particular, when device 1 has upstream cartridge piercer(s) 34 and downstream cartridge piercer 30, it is preferable to provide a cartridge pusher 36,37 associated with each of the upstream and downstream piercers 30,34. Hence, there is no risk of improper removal of cartridge 9 from device 1 at reopening of device 1.

Upstream pusher 36 and/or downstream pusher 37 may be provided in the shape of a piston, in particular a linearly movable piston.

Device 1, in particular the downstream part 8, may have at least one cartridge positioning element 39, in particular a pair of positioning elements, that guides cartridge 9 in a cartridge brewing alignment 3,3' between the upstream and downstream parts 7,8.

Hence, axis 3' of cartridge 9 is not merely brought to the proper height inbetween open upstream and downstream parts 7,8 but also laterally aligned thereinbetween. Axis 3' of cartridge 9 is brought to match axis 3 of extraction axis 3 of parts 7,8. Axis 3 may central extending through chamber 11. Axis 3' can centrally extend through cartridge 9, as illustrated in FIG. 1a.

Positioning element 39 is in particular located on a peripheral lower part 9'' of cartridge 9 when cartridge 9 is aligned between upstream and the downstream parts 7,8. Optionally, positioning element 39 may deform cartridge 9 in the closing direction when upstream and downstream parts 7,8 are relatively moved into the closed position.

Such a cartridge positioning element 39 prevents misalignment of cartridge 9 when the latter is merely held by holding member 10.

As illustrated in FIGS. 1b and 1c, positioning element 39 slightly projects from upstream or downstream parts 7,8 whereby cartridge 9 is not held by positioning element 39 at opening or closure of device 1. Element 39 has an arched contact portion 39' so that arched envelope 9', in particular part 9'', of cartridge 9 is positioned by a single contact point or spot on element 39. Hence, by providing a couple of such contact elements 39 in combination with holder 10, the horizontal positioning of cartridge 9 and the alignment of cartridge 9 with extraction device 1 can be ensured.

As illustrated in the appended Figures, holder 10 and positioning element(s) 39 are not necessarily assembled to the same part of the upstream and downstream parts 7,8. They can be assembled to the same or to different parts. However, their functions are somewhat different: holder 10 holds cartridge 9 against the force of gravity and positioning element 39 adjusts the alignment of cartridge 9 with the upstream and downstream parts 7,8 for proper enclosure of cartridge 9 between these parts 7,8.

The invention also relates to the use of a cartridge 9 for a system 7,8,9 as described above, or a method of extracting a cartridge 9 in such a system.

The invention claimed is:

1. A method for using a cartridge in a device, the method comprising:
    brewing an ingredient in the cartridge by supplying a brewing liquid, the device having a upstream cartridge enclosing part and a downstream cartridge enclosing part relatively movable between an open position for inserting and/or removing the cartridge and a closed position for forming a brewing chamber enclosing the cartridge during brewing, the brewing chamber has a confining expansion space which is unoccupied by the cartridge when the upstream cartridge enclosing part and the downstream cartridge enclosing part are in the closed position enclosing the cartridge and occupied by the cartridge upon expansion thereof caused by exposure of the ingredient to the brewing liquid to produce a beverage, the confining expansion space is delimited by a groove or recess adjacent to a peripheral portion of the cartridge when the cartridge is enclosed by the upstream cartridge enclosing part and the downstream cartridge enclosing part.

2. The method of claim 1, wherein the confining expansion space has a volume that is 1 to 10% of a volume of the brewing chamber or of a volume of an ingredient cavity of the cartridge, when the upstream cartridge enclosing part and the downstream cartridge enclosing part are in the closed position for enclosing the cartridge prior to expansion of the cartridge; and the cartridge upon expansion occupies at least 80% of the confining expansion space.

3. The method of claim 1, wherein the confining expansion space is defined by the downstream cartridge enclosing part and/or a surface that is angled away from a facing surface of the cartridge before expansion thereof.

4. The method of claim 1, wherein the upstream cartridge enclosing part comprises a liquid injector for supplying the brewing liquid into the cartridge, the liquid injector comprising a piercer for piercing an upstream part of an envelope of the cartridge, the piercer defines internally or partly internally thereof a liquid injection conduit that injects the brewing liquid into the cartridge upon piercing thereof, and the piercer has a base with a projecting reinforcing foot.

5. The method of claim 1, comprising pushing the cartridge away from the upstream cartridge enclosing part at removal of the cartridge, and the upstream cartridge enclosing part pushes the cartridge away.

6. The method of claim 1, comprising piercing the cartridge with a piercing member on the downstream cartridge enclosing part and then using the downstream cartridge enclosing part to assist removal of the cartridge from the piercing member.

* * * * *